(12) United States Patent
Andre et al.

(10) Patent No.: US 10,581,138 B2
(45) Date of Patent: Mar. 3, 2020

(54) DETECTION OF THE OPENING OF A DATA INPUT DEVICE

(71) Applicant: Ingenico Group, Paris (FR)

(72) Inventors: Jerome Andre, Montoison (FR); Michel Rossignol, Monteleger (FR); Olivier Berthiaud, Cornas (FR)

(73) Assignee: INGENICO GROUP, Paris (FR)

(*) Notice: Subject to any disclaimer, the term of this patent is extended or adjusted under 35 U.S.C. 154(b) by 0 days.

(21) Appl. No.: 15/570,122

(22) PCT Filed: Apr. 27, 2016

(86) PCT No.: PCT/EP2016/059448
§ 371 (c)(1),
(2) Date: Oct. 27, 2017

(87) PCT Pub. No.: WO2016/174114
PCT Pub. Date: Nov. 3, 2016

(65) Prior Publication Data
US 2018/0144884 A1    May 24, 2018

(30) Foreign Application Priority Data

Apr. 27, 2015 (FR) ..................... 15 53778

(51) Int. Cl.
*H01Q 1/22* (2006.01)
*G06F 3/02* (2006.01)
*H01Q 1/24* (2006.01)
*H01Q 9/42* (2006.01)
*G07F 19/00* (2006.01)
(Continued)

(52) U.S. Cl.
CPC ......... *H01Q 1/2216* (2013.01); *G06F 3/0202* (2013.01); *G06F 21/83* (2013.01); *G06Q 20/206* (2013.01); *G06Q 20/341* (2013.01); *G07F 7/1033* (2013.01); *G07F 19/205* (2013.01); *G07G 1/0018* (2013.01); *H01H 13/70* (2013.01); *H01H 13/83* (2013.01); *H01Q 1/24* (2013.01); *H01Q 9/42* (2013.01); *H01H 13/86* (2013.01); *H01H 2219/062* (2013.01);
(Continued)

(58) Field of Classification Search
CPC ........ H01H 13/70; H01H 13/83; H01H 13/86; H01H 2231/006; H01H 2239/032
USPC ...................... 200/5 A, 61.93, 293
See application file for complete search history.

(56) References Cited

U.S. PATENT DOCUMENTS

| | | |
|---|---|---|
| 2003/0047433 A1 | 3/2003 | Morre |
| 2011/0100788 A1 | 5/2011 | Eck et al. |
| 2011/0215938 A1* | 9/2011 | Neo ............... G08B 13/22 340/635 |

FOREIGN PATENT DOCUMENTS

| | | |
|---|---|---|
| WO | 2009122077 A2 | 10/2009 |
| WO | 0169560 A1 | 9/2011 |

OTHER PUBLICATIONS

French Search Report and Written Opinion dated Feb. 24, 2016 for corresponding French Application No. 1553778, filed Apr. 27, 2015.
(Continued)

*Primary Examiner* — Edwin A. Leon
*Assistant Examiner* — Lheiren Mae A Caroc
(74) *Attorney, Agent, or Firm* — David D. Brush; Westman, Champlin & Koehler, P.A.

(57) ABSTRACT

A support element of a keypad included in a keyboard of a data input device. The support element puts at least one dummy key of a printed circuit board under pressure.

7 Claims, 3 Drawing Sheets

(51) Int. Cl.
*G07F 7/10* (2006.01)
*G06Q 20/34* (2012.01)
*G06F 21/83* (2013.01)
*G06Q 20/20* (2012.01)
*G07G 1/00* (2006.01)
*H01H 13/70* (2006.01)
*H01H 13/83* (2006.01)
*H01H 13/86* (2006.01)
*H01Q 1/36* (2006.01)

(52) U.S. Cl.
CPC . *H01H 2231/006* (2013.01); *H01H 2239/032* (2013.01); *H01Q 1/36* (2013.01)

(56) References Cited

OTHER PUBLICATIONS

International Search Report dated Jul. 13, 2016 for corresponding International Application No. PCT/EP2016/059448, filed Apr. 27, 2016.
English translation of the Written Opinion of the International Searching Authority dated Sep. 5, 2017 for corresponding International Application No. PCT/EP2016/059448, filed Apr. 27, 2016.

* cited by examiner

DETECTION OF THE OPENING OF A DATA INPUT DEVICE

CROSS-REFERENCE TO RELATED APPLICATIONS

This Application is a Section 371 National Stage Application of International Application No. PCT/EP2016/059448, filed Apr. 27, 2016, which is incorporated by reference in its entirety and published as WO 2016/174114 A1 on Nov. 3, 2016, not in English.

1. FIELD OF THE INVENTION

The invention relates to the field of data entry or input devices such as payment terminals. The invention relates more particularly to the field of payment data input devices using keyboards, for example back-lit keyboards. Payment terminals generally integrate a keyboard or pinpad to enable the input of information such as a personal identification code or transaction data. The keyboards are usually back-lit, i.e. they are illuminated from the rear of the keyboard. In classic applications, with back-lighting, the keyboard is constituted by capping pieces, one or more keypads with silicone keys and a transparent element used to scatter the light from the back-lighting process (this light itself coming from one or more light-emitting diodes or LEDS). Conventionally, this transparent part is called a light guide. There also exist data input devices where the keyboard is not back-lit. The proposed technique can also be applied to such devices as shall be explained here below.

2. PRIOR ART

In payment terminals, protection is needed against attempts at fraud. Thus, protective measures are taken. These protective measures are either hardware measures or software measures. Hardware protective measures include especially techniques for protecting the keyboard of the terminal. It is especially necessary to take precautions for example against attempts to retrieve a personal identification code or more generally attempts to spy on the keyboard.

In old-generation terminals, the size of the terminal itself and the size of the keys of the terminal keyboard make it possible to spread the keys apart more or less widely. This is of value because techniques known as "dummy key" techniques are used to boost security and verify that the terminal does not undergo any dismantling attempt. Indeed, a payment terminal conventionally has an upper half-shell and a lower half-shell. The upper half-shell has apertures that for example allow the keys of the keyboard to pass through. The upper half-shell also includes an aperture for the display screen of the terminal. On the keyboard, the dummy-key devices are used to verify, on the one hand, that the upper half-shell of the terminal is properly fitted into the lower half-shell and, on the other hand, that the dummy keys rest on at least one printed-circuit board (motherboard) present in the payment terminal. This ensures that the payment terminal is not open and therefore that there is no attempt to insert a spy device into the keyboard of the payment terminal for example. The dummy keys are pressed for example by means of a plastic extension (which may or may not be unperforated) extending from the interior of the upper half-shell in such a way as to take position on the dummy key of this printed-circuit board (the motherboard).

This prior art solution is generally fairly efficient. However, this solution is quite old and not necessarily suited to novel types of payment terminals.

Indeed, this prior-art solution raises at least two problems: the first problem relates to the fact that it is difficult to create such dummy keys when the keys of the keyboard are arranged compactly and close to each other. Indeed, the prior-art solution requires relatively large spaces between the keys so that the plastic extensions extending from the interior of the upper half-shell can pass through the keyboard and take position on the dummy key of the motherboard. Now, the goal of reducing the size of the payment terminals means that the space for such plastic extensions will not necessarily be available.

The second problem relates to the manufacturing of the plastic extension itself and, from a more general viewpoint, to the manufacturing of the upper half-shell. This manufacturing raises problems in terms of both aesthetics and security. From the aesthetic viewpoint, on the visible, external face of the upper half-shell, the presence of extensions causes a slight, hollow deformation at the place where this extension is situated. This is because the lower and upper half-shells, like the majority of the other plastic parts needed to manufacture the terminal, are manufactured by means of a method of injection in which hot plastic material is introduced under pressure into a mold. The injection of plastic causes deformations at certain positions in the parts, for example in the extensions. The problem of security stems from this aesthetic problem. The fact is that an attacker knows precisely where the dummy keys are situated by observing the keyboard: the deformations that are present between the keys, at the positions where the plastic extensions extend towards the dummy keys disposed on the motherboard of the terminal, make it easy to identify the location of these dummy keys and therefore to inform the attacker on the places where these dummy keys are not situated. The attacker can then try to pierce the upper half-shell to insert a spy device therein.

One solution to this problem is to cover the upper half-shell with a film or a sheathing used to mask these deformations and these imperfections. Unfortunately, this solution would not resolve the problem of available space for plastic extensions. Another solution could be to use a different plastic material that would not have these problems of deformation. Apart from the fact that they do not resolve the problem of space, such a solution would also be costly.

3. SUMMARY OF THE INVENTION

The present disclosure makes it possible to resolve at least some of the problems posed by these terminals of the prior art. Indeed, the invention defines a support element of a keypad included in a keyboard of a data input device. Such an element comprises means for putting at least one dummy key of a printed-circuit board under pressure.

Thus, this support element, which is not an external part of the terminal, and which is therefore not visible on the exterior of the terminal, makes it possible to fulfil a securing function by putting pressure on the dummy keys of the motherboard and, at the same time, to prevent these dummy keys from being identified.

According to one particular characteristic, the means for putting at least one dummy key of a printed-circuit board under pressure comprise at least one deformable nipple situated on a lower face of said element.

According to one particular characteristic, said means for putting at least one dummy key under pressure include means for receiving pressure coming from an upper half-shell of said data input device.

Thus, the element is put under pressure only when the terminal is closed again (i.e. becomes functional) after assembly. There is a system available for transferring the load of the half-shell to the support element which in turn exerts pressure on the dummy keys.

According to one particular embodiment, said support element takes the form of a light guide that is shaped so as to be positioned above a printed-circuit board comprising said at least one dummy key.

Thus, it is not necessary to plan for an additional part inside the payment terminal: rather, the invention uses an existing part in adding a complementary function to it.

According to one particular embodiment, said support element takes the form of a rectangular parallelepiped, the length of which depends on the length of a first predetermined number of keys of said keyboard, the width of which depends on the width of a second determined number of keys and therefore the thickness of which depends on the thickness of said data input device in which said element takes position. The element furthermore comprises at least one lateral tab extending substantially vertically, said at least one lateral tab further comprising an oblong hole extending substantially vertically.

According to one particular characteristic, the support element comprises two lateral tabs extending substantially vertically and each comprising an oblong hole extending substantially vertically, said tabs being situated so as to be facing each other, each situated on one side of said element.

According to one particular embodiment, when said element is a light guide, the upper face of said element comprises as many through holes as the keyboard has keys, one hole corresponding to one key of said keyboard.

In one particular aspect, the technique relates to a data input device comprising a keyboard, such a data input device comprising a support element of a keyboard as defined here above, said support element taking position between a printed-circuit board of said input device and a keypad comprising said keys of said keyboard, the support element of a keypad being mobile between a first mounting position in which said support element is mounted on an internal structure of said data input device and a second position of putting under pressure in which said support element exerts pressure on a dummy key of said electronic surface by transferring a pressure that it receives from an upper half-shell of said data input device.

4. FIGURES

Other features and advantages shall appear more clearly from the following description of one particular embodiment of the disclosure, given by way of a simple illustratory and non-exhaustive example and from the appended figures, of which:

5. DESCRIPTION

Figure 1:
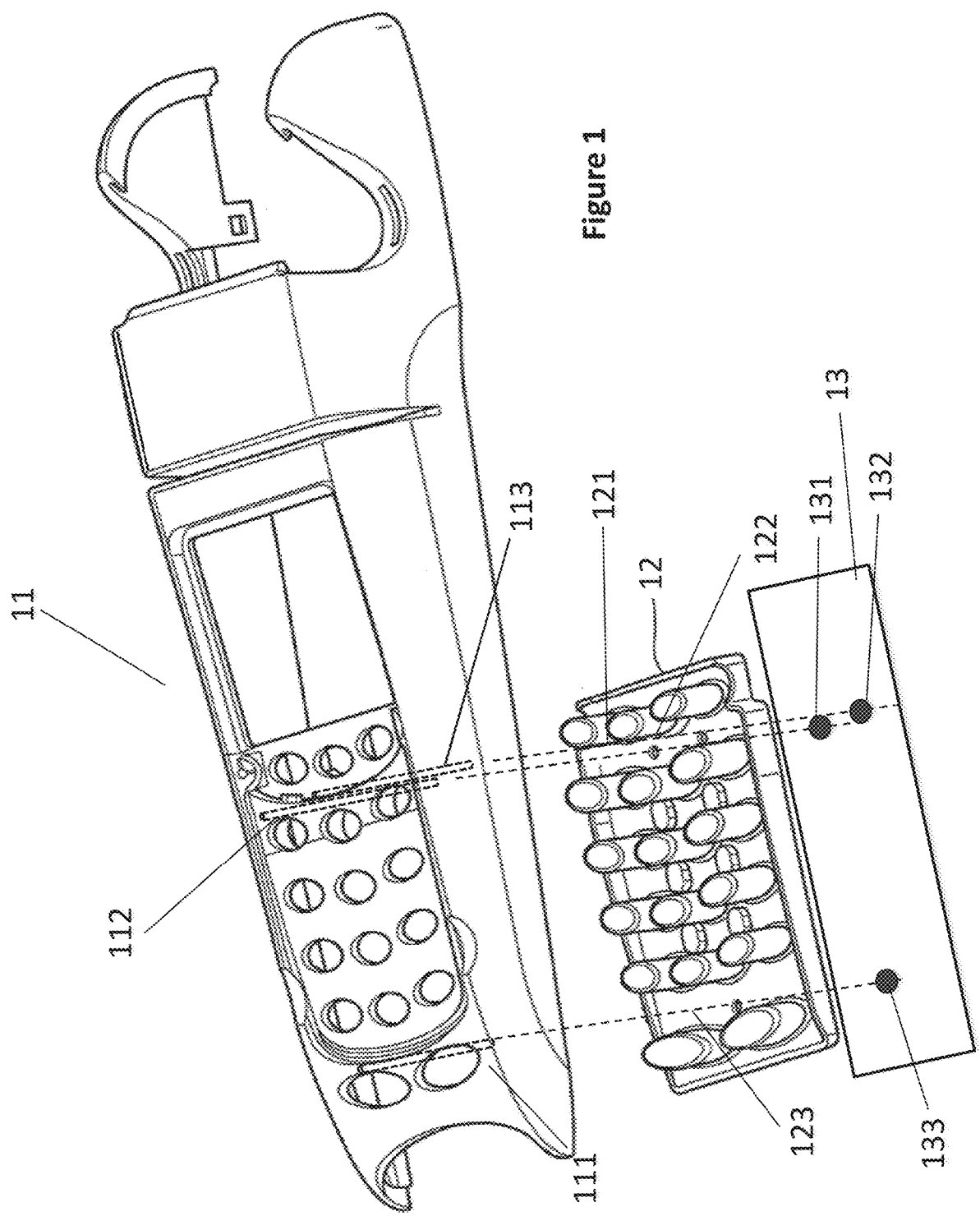
FIG. 1 is a schematic view of a payment terminal of the prior art.

The general principle of the technique described consists in transferring the function of pressure on the dummy keys either to a part specifically dedicated to this purpose or to a light guide when such a light guide exists. The technique relates more specifically to a support element of a keypad included in a keyboard of a data input device. This support element comprises means for putting at least one dummy key of a printed-circuit board under pressure. The means for putting under pressure comprise at least one deformable nipple situated on a lower face of the support element. The means for putting under pressure also comprise, in one embodiment, means for receiving pressure coming from an upper half-shell of the data input device.

More particularly, in one embodiment, the light guide is used as an element for transferring pressure to the dummy keys: the light guide is then the support element of the keypad. The light guide thus, either directly or indirectly, exerts pressure on the dummy keys of the motherboard. It is then no longer necessary to provide extensions, on the upper half-shell, that extend up to the dummy keys of the motherboard. The result of this is that the potential attacker can no longer guess where these dummy keys are situated and the upper half-shell no longer has aesthetic flaws. Additionally, the described technique also resolves a major problem of the assembly and joining of the data input device (for example a payment terminal or a pinpad): as explained here below, the mounting of the device is made easier because the joining of the light guide to the motherboard makes sure that the light guide cannot slide or fall off the motherboard. This enables easier handling of the terminal during assembly. This also makes it possible, as compared with prior art techniques, not to have to guide the plastic extensions with precision in the holes made in the keypad with silicone keys and in the light guide: the final assembly of the terminal (i.e. the joining of the upper half-shell with the lower half-shell) is therefore greatly facilitated, which means that it is less costly.

When there is no light guide and when the silicone keys of the keypad are directly in contact with the corresponding keys on the motherboard, the technique can take the form of the use of a complementary plastic element serving for example as a frame for the silicone keys of the keypad unit and, at the same time, fulfilling the functions of transferring pressure to the dummy keys of the keyboard of a motherboard. This complementary part constitutes the support element of the keypad.

Here below and with respect to the above, it is understood that a keyboard, as understood in the present invention, comprises a keypad including a certain number of keys (made of silicone or another deformable material) or even a keypad with mechanical keys. When the terminal or pinpad is mounted, the keys of this keypad are situated so as to be facing contacts mounted on the motherboard. Pressing on a key of the keypad creates pressure on the corresponding contacts of the motherboard. Between the "regular" contact pads corresponding to real keys of the keyboard, security contacts are placed, and these are called "dummy keys". These security contacts are pressed during the operation of the data input device. If it happens that one of the security contacts is not being pressed or is no longer being pressed, the device according to the invention passes into intrusion mode and implements security measures (the erasure of the memory for example).

By way of an indication, an example of a prior-art terminal is described with reference to FIG. 1. FIG. 1 illustrates the structure of a prior-art payment terminal. This payment terminal comprises an upper half-shell 11, a keypad 12 with silicone keys forming the flexible keys of a keyboard and, as the case may be, a light guide (not shown), a motherboard 13 and a lower half-shell that is not shown. During the assembly of the payment terminal, the upper half-shell 11 and the lower half-shell are joined and fit into the keypad 12 and the motherboard 13. The plastic extensions 111, 112 and 113 extend from the interior of the upper half-shell passing through the keypad 12 with silicone keys (and the light guide if it exists) by the orifices 121, 122 and 123, and apply pressure to the dummy keys 131, 132 and 133 of the motherboard 13 (the extensions can be provided with complementary elements to exert pressure on the dummy keys such as silicone pucks). When the terminal is opened, the extensions move the dummy keys apart. This opening (intrusion) is then detected by the detection circuit connected to the dummy keys and enable the activation of the terminal protection mechanism (which consists for example of the erasure of the secured memories of the terminal). By contrast, when the attacker knows the location of the dummy keys (because of the deformations of the plastic material of the upper half-shell), he can easily attack the terminal by trying to pierce the upper half-shell to introduce a spy device therein or again to try and maintain pressure on the dummy keys even when the terminal is being dismantled.

The proposed technique makes it possible to counter such attempts. The proposed technique is furthermore perfectly suited to small-sized devices for which it cannot be envisaged to have extensions as defined here above.

Figure 2:
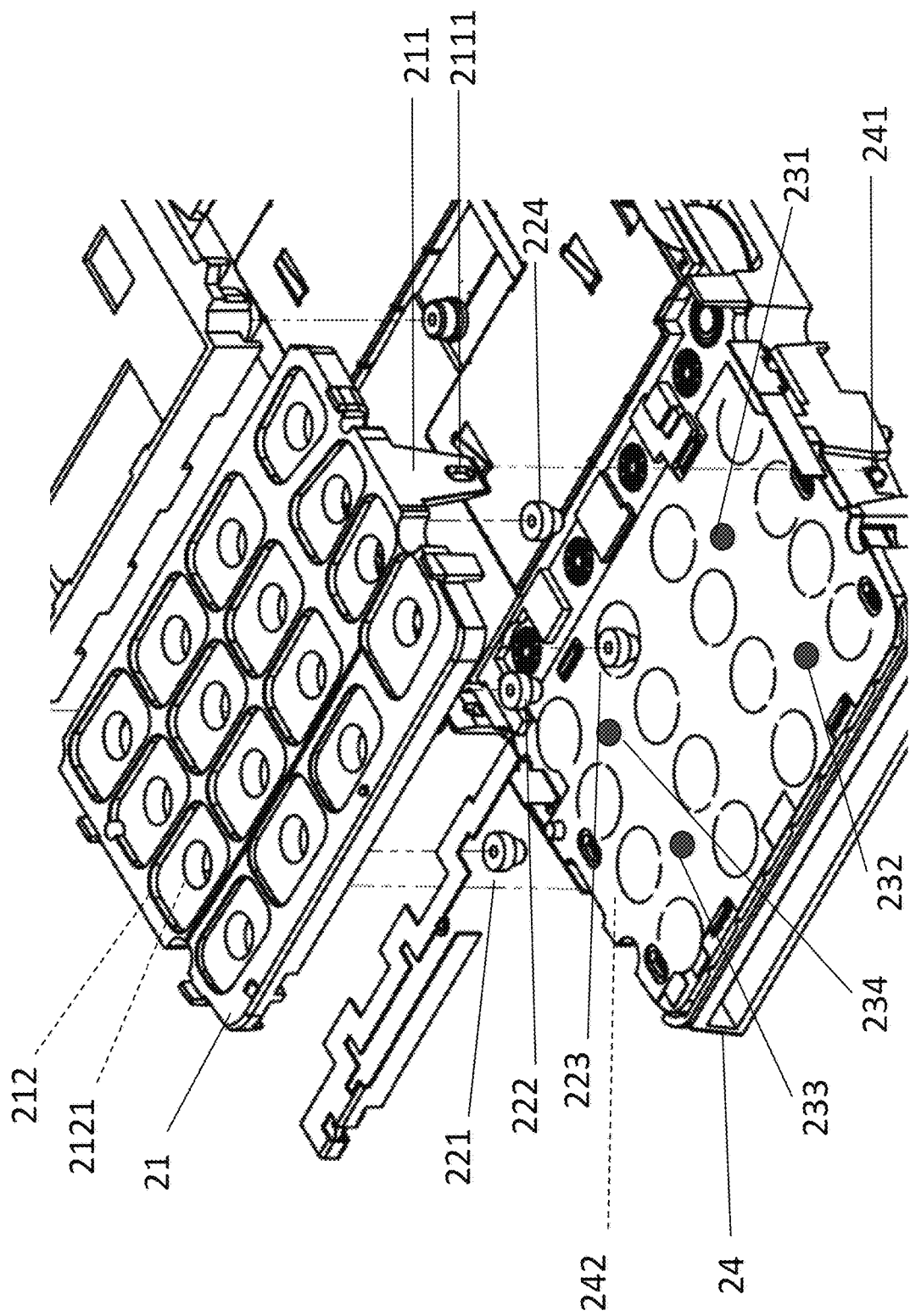
FIG. 2 illustrates the light guide and the motherboard of the payment terminal according to one embodiment of the invention.

FIG. 2 illustrates a light guide 21 and a motherboard 23 disposed on an internal structure 24 according to one embodiment of the present invention.

As described in FIG. 2, the support element takes the form of a rectangular parallepiped the length of which depends on the length of a first pre-determined number of keys of said keyboard, the width of which depends on the width of a second pre-determined number of keys, and the thickness of which depends on the thickness of said data input device in which said element takes position. In the embodiment presented in FIG. 2, the element corresponds to the length of four keys and the width of four keys. The support element also comprises two lateral tabs (211, 212) extending substantially vertically and each comprising an oblong hole (2111, 2121) extending substantially vertically. This hole enables the support element (when it is attached to the internal structure of the data input device) to have a vertical movement (from top to bottom): the first position (top position) corresponds to the assembly position. The second position (the low position, see FIG. 3) corresponds to the position of putting under pressure (during operation).

Again, in this embodiment, the element is a light guide but this is only one example. Thus, unlike in prior art payment terminals, this embodiment proposes an inventive solution that uses the light guide 21 to create pressure on the dummy keys 231, 232 and 233. Thus, this approach avoids the use of plastic extensions extending from the interior of this upper half-shell. The designing of the upper half-shell is therefore simplified. Furthermore, the external face of the upper half-shell no longer has slight deformations caused by the extensions. This gives improved aesthetic features and improved security. Besides, the solution of the invention is perfectly suited to terminals having keys of the keyboard that are disposed so as to be compact and close together and for which it is difficult to implement the prior-art solutions.

In this embodiment illustrated by FIG. 2, the pressure of the light guide 21 on the dummy keys is for example obtained by means of nipples or pads 221, 222, 223 and 224 made of silicone. Each silicone nipple or pad has an extremity made of rubber (which can be conductive depending on the embodiments) that enables the activation of a corresponding dummy key made of a deformable material (or copper). Naturally, the silicone nipples or pads 221-224 can be replaced by pads of any other materials, for example rubber, plastic etc. Besides, the copper dummy key can be replaced by any component used to detect pressure or to set up an electrical bridge or contact.

In another embodiment, the pads are made of material identical to that of the light guide and the pads and the light guide form one and only one part. The light guide according to this embodiment makes it easier to assemble the payment terminal. Indeed, it is no longer necessary to position the pads when assembling the payment terminal.

The light guide is a part situated beneath the upper half-shell. As its name indicates, it is used to guide light towards the keys of the keyboard when this keyboard has to be used. This light guide 21 comprises an additional characteristic: it has at least one zone for transferring load so that the light guide 21 rests on the dummy keys 231-234 only when the terminal is assembled. The light guide is shaped so that, on at least one of its sides, it has a zone that comes into contact with the upper half-shell when this upper half-shell is joined with the lower half-shell. As soon as the terminal (a half-shell) is open, the silicone pads 221-224 resume their initial shape and the light guide moves the dummy keys 231-234 apart. This additional characteristic thus enables the terminal to detect intrusions by the opening of the casing (a half-shell) of the terminal.

The light guide also has two zones of fixed attachment with the internal structure 24, enabling the light guide 21 to be mounted without its being easy to subsequently dismount this light guide. It is thus easier to handle the terminal during assembly since there is no risk of letting the light guide 21 drop. To this end, the invention uses two oblong holes 2111, 2112 on two lateral tabs 211, 212 of the light guide 21. These two oblong holes 2111, 2121 co-operate with two clips (241, 242) disposed on the internal structure 24 of the terminal. The internal structure of the terminal comprises especially a frame made of plastic material furthermore having at least one location to receive a printed-circuit board (the motherboard of the terminal). The two oblong holes 2111, 2121 enable a translational motion on the part of the light guide 21 so that it is effectively pressed against the motherboard 23 only when the upper half-shell is being joined with the lower half-shell. Thus, these oblong holes have two functions: the first function is to guide the translational movement of the light guide during the assembly (and disassembly) of the terminal so that the light guide maintain a reference position. The second function is to enable easy mounting of the light guide and equally easy handling when the light guide is mounted.

Figure 3:
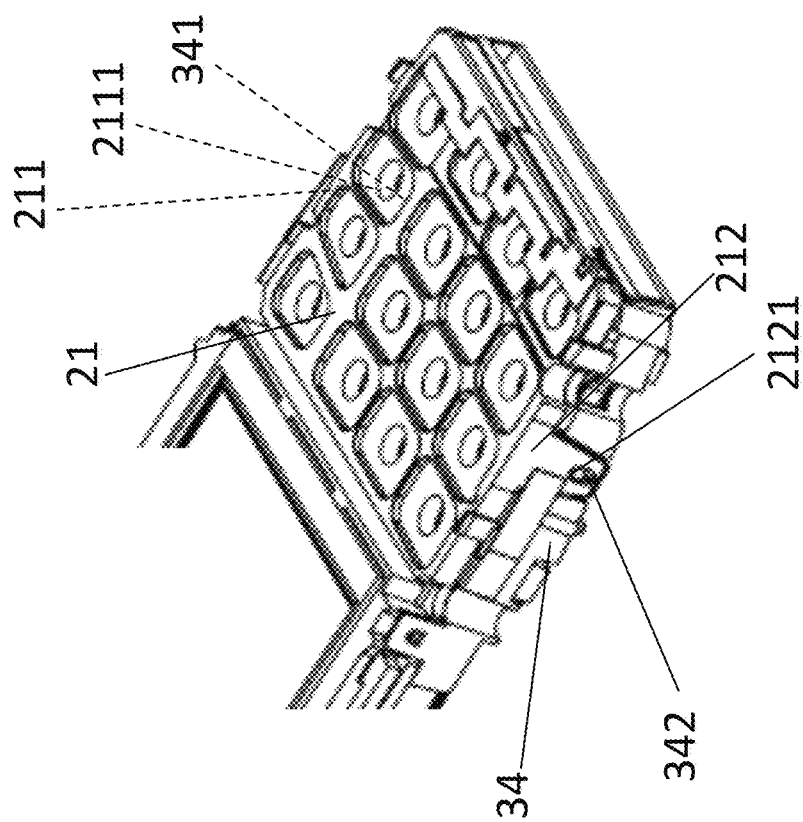
FIG. 3 illustrates the mounting of the light guide and the internal structure according to one embodiment of FIG. 2.

FIG. 3 illustrates the mounting of the light guide 21 as well as the motherboard 23 and the internal structure 24. The two clips 341, 342 disposed on the internal structure 24 enter the two oblong holes 2111, 2121 of the two lateral tabs 211, 212 of the light guide. The two clips 341, 342 do not fill the internal spaces of the two oblong holes 2111, 2121. When the light guide 21 is mounted in the internal structure 24, the clips 341, 342 are situated in a lower position inside the oblong holes 2111, 2121. When the payment terminal is being assembled, the upper half-shell exerts pressure on the light guide 21. The light guide 21 therefore has a translational motion towards the internal structure 34 and the two clips 341, 342 shift towards the top relative to the oblong holes 2111, 2121 of the side tabs 211, 212. The light guide 21 effectively gets pressed against the motherboard during the assembly of the upper half-shell.

The invention claimed is:

1. A support element of a keypad included in a keyboard of a data input device, wherein said support element forms a light guide comprising:
   an upper face parallel to the keypad; and
   first and second lateral tabs extending perpendicularly to the upper face, said first and second lateral tabs being situated so as to be facing each other, on opposite sides of said light guide and each comprising an oblong hole extending substantially vertically and passing through the respective lateral tab in a direction parallel to the upper face of the light guide, said oblong holes cooperating with two clips disposed on an internal structure of said data input device, enabling a translational motion of the light guide so as to put at least one dummy key of a printed-circuit board under pressure.

2. The support element according to claim 1, wherein said light guide comprises at least one deformable nipple situated on a lower face of said light guide, said nipple activating at least one of the at least one dummy key when under pressure.

3. The support element according to claim 1, wherein said light guide comprises means for receiving pressure coming from an upper half-shell of said data input device.

4. The support element according to claim 1, wherein the light guide is shaped to be positioned above the printed-circuit board comprising said at least one dummy key.

5. The support element according to claim 4, wherein the upper face of said support element comprises as many through holes as the keyboard has keys, one hole corresponding to one key of said keyboard.

6. The support element according to claim 1, wherein the light guide takes the form of a rectangular parallelepiped, the length of which depends on the length of a first pre-determined number of keys of said keyboard, the width of which depends on the width of a second determined number of keys of said keyboard and therefore the thickness of which depends on the thickness of said data input device in which said light guide takes position.

7. A data input device comprising:
   an upper half-shell;
   an internal structure;
   a printed circuit board having at least one dummy key;
   a keyboard comprising a keypad having keys;
   a support element forming a light guide taking position between the printed-circuit board and the keypad, the light guide comprising an upper face parallel to the keypad and first and second lateral tabs extending perpendicularly to the upper face, said first and second lateral tabs being situated so as to be facing each other, on opposites sides of said light guide and each comprising an oblong hole extending substantially vertically and passing through the respective lateral tab in a direction parallel to the upper face of the light guide, said oblong holes cooperating with first and second clips disposed on the internal structure of said data input device, enabling a translational motion of the light guide so as to put the at least one dummy key of the printed-circuit board under pressure.

* * * * *